United States Patent
Kim et al.

(10) Patent No.: US 12,207,741 B2
(45) Date of Patent: Jan. 28, 2025

(54) INFANT CARRIER ASSEMBLIES

(71) Applicant: Graco Children's Products, Inc., Atlanta, GA (US)

(72) Inventors: Douglas Kim, Atlanta, GA (US); Tyler Petito, Atlanta, GA (US); Joonho Na, Atlanta, GA (US); Thomas Jake Mitchell, Atlanta, GA (US); Phillip LaPlante, Atlanta, GA (US); Patrick Kil, Atlanta, GA (US); Matthew Johnson, Atlanta, GA (US)

(73) Assignee: GRACO CHILDREN'S PRODUCTS INC., Atlanta, GA (US)

( * ) Notice: Subject to any disclaimer, the term of this patent is extended or adjusted under 35 U.S.C. 154(b) by 141 days.

(21) Appl. No.: 18/120,028

(22) Filed: Mar. 10, 2023

(65) Prior Publication Data

US 2023/0301441 A1 Sep. 28, 2023

Related U.S. Application Data

(60) Provisional application No. 63/269,772, filed on Mar. 22, 2022.

(51) Int. Cl.
*A47D 13/02* (2006.01)
*B60N 2/28* (2006.01)

(52) U.S. Cl.
CPC ......... *A47D 13/025* (2013.01); *B60N 2/2821* (2013.01); *B60N 2/286* (2013.01)

(58) Field of Classification Search
None
See application file for complete search history.

(56) References Cited

U.S. PATENT DOCUMENTS

| | | | |
|---|---|---|---|
| 4,915,446 A | 4/1990 | Darling et al. | |
| 5,772,279 A * | 6/1998 | Johnson, Jr. ......... | B60N 2/2848 297/440.16 |
| 6,367,875 B1 * | 4/2002 | Bapst ................... | B60N 2/2863 297/130 |
| 7,311,353 B1 * | 12/2007 | Johnson ............... | B60N 2/2848 280/30 |
| 9,771,006 B2 | 9/2017 | Forbes | |
| 10,377,274 B2 | 8/2019 | Anderson et al. | |
| 10,589,643 B2 | 3/2020 | Sack et al. | |
| 11,034,266 B2 | 6/2021 | Heisey et al. | |

(Continued)

FOREIGN PATENT DOCUMENTS

EP 1837230 B1 10/2012

OTHER PUBLICATIONS

Maxi Cosi Coral, https://www.amazon.com/Maxi-Cosi-Coral-Infant-Essential-Graphite/dp/B092S8QMGN, Accessed Mar. 10, 2023, 1 page.

(Continued)

*Primary Examiner* — David E Allred
(74) *Attorney, Agent, or Firm* — Eversheds Sutherland (US) LLP

(57) ABSTRACT

An infant carrier assembly may be removably securable to a car seat. The infant carrier assembly may include an adapter and an infant carrier. The adapter is removably securable to the car seat. The infant carrier is removably securable to the car seat by engagement with the adapter. A car seat assembly may include a car seat and the infant carrier assembly.

20 Claims, 7 Drawing Sheets

(56) References Cited

U.S. PATENT DOCUMENTS

| | | | |
|---|---|---|---|
| 2005/0110318 A1* | 5/2005 | Meeker | B60N 2/2845 |
| | | | 297/130 |
| 2005/0127727 A1* | 6/2005 | Gangadharan | B60N 2/2845 |
| | | | 297/256.16 |
| 2008/0303321 A1* | 12/2008 | Powell | B60N 2/2863 |
| | | | 297/216.11 |
| 2012/0180927 A1 | 7/2012 | Jane Santamaria | |
| 2015/0091348 A1* | 4/2015 | Juchniewicz | B60N 2/2821 |
| | | | 297/256.16 |
| 2018/0056823 A1 | 3/2018 | Anderson et al. | |
| 2018/0220808 A1 | 8/2018 | Anderson et al. | |
| 2018/0236905 A1 | 8/2018 | Gebhardt et al. | |
| 2021/0022524 A1 | 1/2021 | Coakley et al. | |
| 2021/0229577 A1* | 7/2021 | Thorne | B60N 2/2893 |
| 2024/0017759 A1* | 1/2024 | Sack | B62B 7/145 |
| 2024/0083311 A1* | 3/2024 | Chen | B60N 2/2869 |
| 2024/0217400 A1* | 7/2024 | Lehman | B60N 2/2863 |

OTHER PUBLICATIONS

Recaro Zero.1, https://recaro-kids.com.my/product/zero-1-i-size/, Accessed Mar. 10, 2023, 1 page.

Recaro Salia, https://www.recaro-kids.com/products/recaro-salia-baby-car-seat?variant=39513938100375, Accessed Mar. 10, 2023, 1 page.

Groowy Jane, https://janeworld.eu/car-seat/800876-groowy.html, Accessed Mar. 10, 2023, 1 page.

\* cited by examiner

INFANT CARRIER ASSEMBLIES

CROSS-REFERENCE TO RELATED APPLICATION

This application claims the benefit of U.S. Application No. 63/269,772, filed Mar. 22, 2022, the entirety of which is hereby incorporated by reference.

TECHNICAL FIELD

The present disclosure relates generally to infant carriers, and in particular, to infant carriers securable in car seats.

BACKGROUND

Car seats may be used to facilitate vehicular travel by children. A need remains for reconfigurable car seat assemblies that permit children of various ages to be safely seated and accommodated in vehicles.

SUMMARY

The present disclosure describes infant carrier assemblies, for example, infant carrier assemblies securable to a car seat.

In aspects, an infant carrier assembly may be removably securable to a car seat. The infant carrier assembly may include an adapter and an infant carrier. The adapter is removably securable to the car seat. The infant carrier is removably securable to the car seat by engagement with the adapter.

In aspects, a car seat assembly may include a car seat and the infant carrier assembly. The infant carrier may be removably secured to the car seat by engagement with the adapter.

Figure 1A:
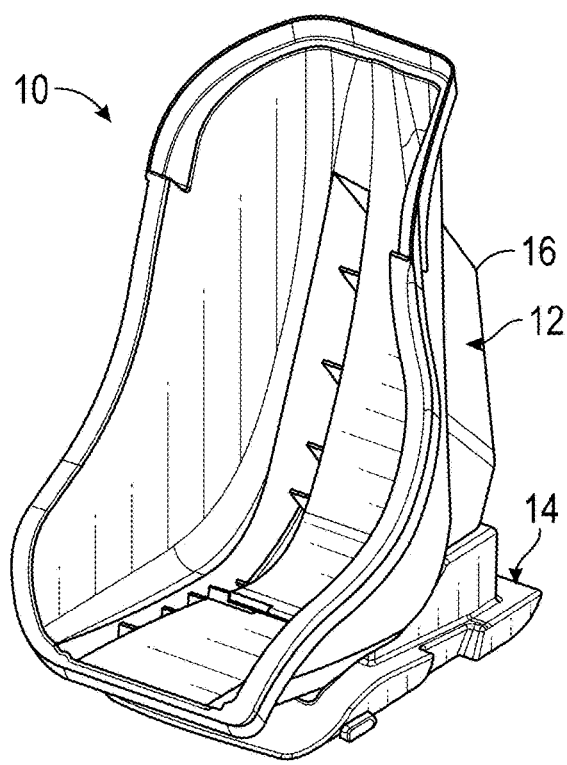
FIG. 1A is a front perspective view of an infant carrier assembly including an infant carrier and an adapter securable within a car seat.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

The present disclosure describes infant carrier assemblies, for example, infant carrier assemblies securable to a car seat.

Car seats are available in a variety of sizes and configurations. Some car seats are intended for use by children of a particular age or weight group, for example, by toddlers. Other car seats are reconfigurable or convertible for use by occupants of different ages and weights. Thus, the same car seat system may be used as an occupant grows in age and weight.

A car seat intended for use by a relatively older occupant may remain secured to a vehicle after the occupant has exited the vehicle. In contrast, a car seat intended for infants may be removed with the occupant remaining within the car seat. However, when a car seat is removed with an infant, carrying the car seat may be cumbersome, for example, because of the bulk and weight of the car seat in addition to the weight of the occupant.

A removable infant carrier or insert may be used with a car seat, for example, with the car seat remaining secured within the vehicle, and with the infant carrier being removed with the occupant. The infant carrier may be relatively lighter and less bulky than the car seat, making it easier to carry and transport the infant carrier than carrying the entire car seat itself.

However, some such systems have relatively large attachment features to secure the infant carrier, for example, such as deep plastic posts on the back of the carrier and deep plastic holes on the seat back. Such a system may occupy a relatively large volume and leave exposed gaps in the seat shell, when the carrier is removed for use by older occupants. Moreover, such systems have relatively large features on the carrier and the seat tend to be relatively heavy and bulky. Moreover, car seats may also have liners and/or padding that interact directly with the carrier when installing the carrier to the larger seat. This makes it overly difficult to install the carrier into the larger seat and harder to determine when the seat is latched.

Other car seats are relatively compact, but may be suitable only for use with relatively small occupants such as infants, and may not be usable with a larger seat. Thus, new car seats may need to be purchased as an occupant grows in age and weight.

The present disclosure provides relatively small and lightweight infant carriers that are less cumbersome and bulky to carry and use. For example, infant carriers and infant carrier assemblies according to the present disclosure may be more portable, have a relatively simpler or minimalistic construction, compared to other infant carriers. Infant carrier assemblies according to the present disclosure may be used with a variety of car seats and/or other types of bases, including so-called convertible car seats or all-in-one car seats, as well as standalone bases, crib-based bases, playpen-based bases, and/or other types of bases that may be distinct from a car seat. The infant carrier assemblies may be usable with one or more of a rear-facing infant car seat (for example, for an occupant having a weight of about 12 lbs to about 40 lbs), a forward-facing harness (for example, for an occupant having a weight of about 22 lbs to about 65 lbs), a highback belt-positioning booster (for example, for an occupant having a weight of about 40 lbs to about 100 lbs), or a backless belt-positioning booster (for example, for an occupant having a weight of about 40 lbs to about 120 lbs). In addition to, or instead of car seats, infant carriers and infant carrier assemblies according to the present disclosure may be usable with one or more of strollers, boosters, infant car seats, or carriers intended to be used outside vehicles.

While infant carrier assemblies are described with reference to an infant carrier and a base, in some aspects, infant carriers according to the present disclosure may be used without a base. For example, the functions or attachments described with respect to the base may be performed or achieved by an infant carrier itself, and the infant carrier itself may be directly securable to a car seat, a stroller, a booster, an infant car seat, or a carrier intended to be used outside a vehicle.

In aspects, an infant carrier assembly may be removably securable to a car seat. The infant carrier assembly may include an adapter and an infant carrier. The adapter is removably securable to the car seat. The infant carrier is removably securable to the car seat by engagement with the adapter.

In aspects, a car seat assembly may include a car seat and the infant carrier assembly. The infant carrier may be removably secured to the car seat by engagement with the adapter.

The adapter may enable a relatively simple securing method, and which may not require forcing an infant carrier into a latch or other such securement system.

Thus, infant carrier assemblies according to the disclosure may use an adapter to fit an infant carrier within a convertible or 4-in-1 seat, adding an additional mode of use. For example, infant carrier assemblies according to the present disclosure may provide five modes of use (infant carrier, rear facing, forward facing, high back booster, no back booster) or six modes of use for a car seat (infant carrier, rear facing, forward facing, high back booster, no back booster, seat belt trainer). Infant carriers according to the present disclosure may thus provide an additional mode of use for convertible car seats, all-in-one car seats, high-back boosters or backless boosters. Such infant carriers, being more compact, may also provide a benefit of increased range of movement for the user, such as a caregiver or responsible person assisting the occupant of the infant carrier.

A relatively small infant carrier can be accommodated and fit within a larger seat, and connectors on the adapter may attach a shell of the infant carrier to the adapter, with optional additional connections to receive the smaller form factor infant carrier.

The infant carrier may be oriented or aligned along the car seat, for example, with a front of the infant carrier aligned with a front of the car seat, or be oriented opposing the car seat. In both configurations, the infant carrier itself may ultimately be disposed in a rear-facing configuration relative to a direction of travel of the vehicle, consistent with the typical direction of use for younger occupants such as infants.

Figure 1B:
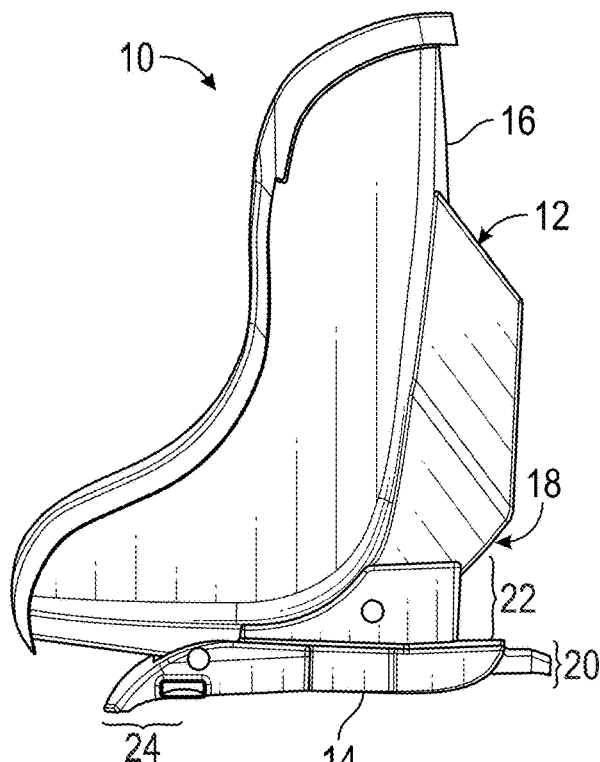
FIG. 1B is a side view of the infant carrier assembly of FIG. 1A.
Figure 1C:
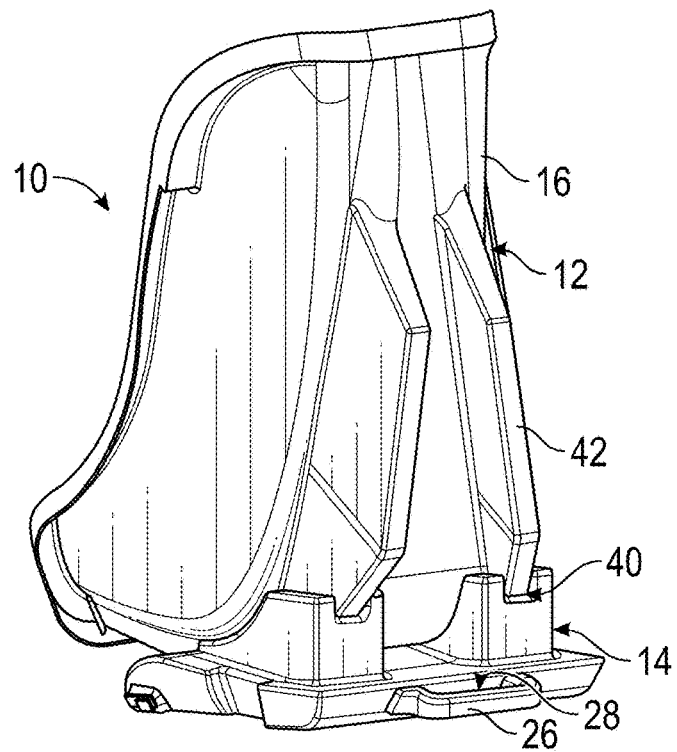
FIG. 1C is a rear perspective view of the infant carrier assembly of FIG. 1A.

FIG. 1A is a front perspective view of an infant carrier assembly 10 including an infant carrier 12 and an adapter 14 securable within a car seat (not shown in FIG. 1A). FIG. 1B is a side view of the infant carrier assembly 10 of FIG. 1A. FIG. 1C is a rear perspective view of the infant carrier assembly 10 of FIG. 1A. In aspects, the infant carrier assembly 10 may be removably securable to a car seat. The infant carrier assembly includes the infant carrier 12 and the adapter 14. The adapter 14 is removably securable to the car seat. The infant carrier 12 is removably securable to the car seat by engagement with the adapter 14.

In FIGS. 1A to 1C, a carrier shell 16 of the infant carrier 12 is shown. Infant carrier 12 may include additional components, such as one or more of padding, liners, or harnesses, or handles (not shown in FIGS. 1A to 1C). The carrier shell 16 may be formed of any suitable rigid material capable of substantially retaining its form. In aspects, the carrier shell 16 includes one or more of a plastic, a metal, an alloy, or combinations thereof. In aspects, the carrier shell 16 is integrally formed as a single molded unit.

The adapter 14 may be formed of any suitable rigid material capable of substantially retaining its form. In aspects, the adapter 14 includes one or more of a plastic, a metal, an alloy, or combinations thereof. In aspects, the adapter 14 is integrally formed as a single molded unit.

The infant carrier 12 may be secured to or engaged with adapter 14 at any suitable interface or surface. In aspects, a rear portion 18 of the infant carrier 12 is securable the adapter 14. In aspects, the adapter 14 includes an adapter base 20 configured to engage a surface of the car seat, and ab adapter body 22 being configured to engage the infant carrier 12.

In aspects, the adapter base 20 defines an adapter lip 24 configured to rest adjacent a front portion of the car seat when the adapter 14 is secured to the car seat. The adaptor lip 24 may be curved downward (for example, toward the car seat). In aspects, the adapter lip 24 defines an upper lip surface and a lower lip surface. The upper lip surface and lower lip surface may be curved downward.

The adapter 14 may include one or more components to facilitate securing the adapter 14 to a car seat, or to a vehicle. In aspects, the adapter 14 includes a seat engagement tab 26. The seat engagement tab 26 may be located at a rear of the adapter 14, for example, at a rear of the adapter base 20. The seat engagement tab 26 may integrally extend from the adapter 14, or may be a distinct element adhered, attached, welded, or otherwise secured to the adapter 14.

As described elsewhere herein, the adapter 14 may be placed in, engaged with, or secured to a car seat, and the infant carrier 12 may be placed in, engaged with, or secured to the car seat via the adapter 14.

Figure 2B:
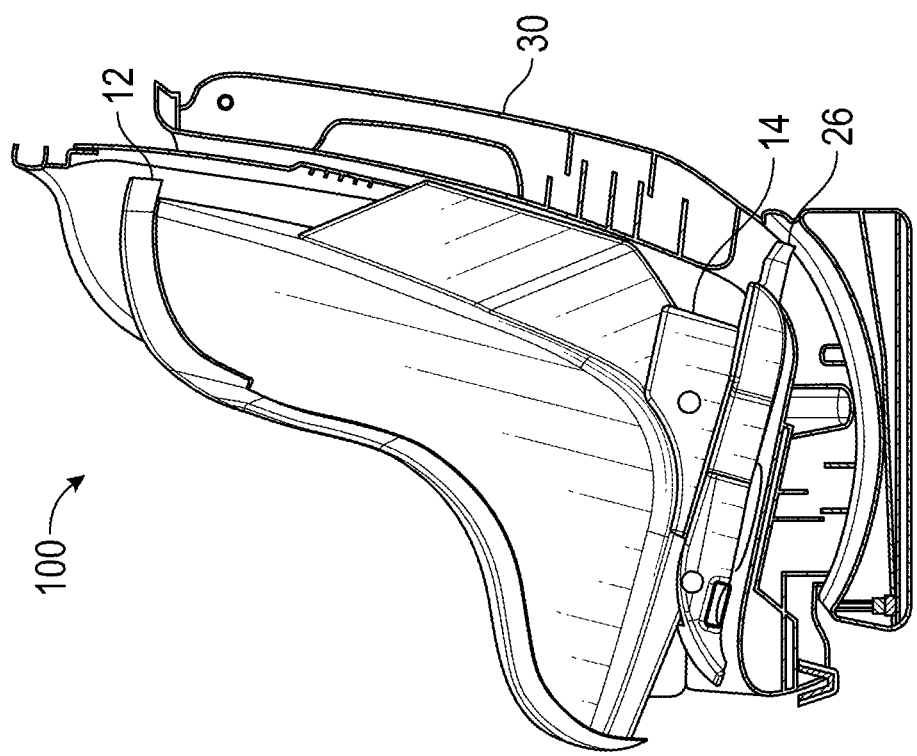
FIG. 2B is a partial side view of the car seat assembly of FIG. 2A.
Figure 2A:
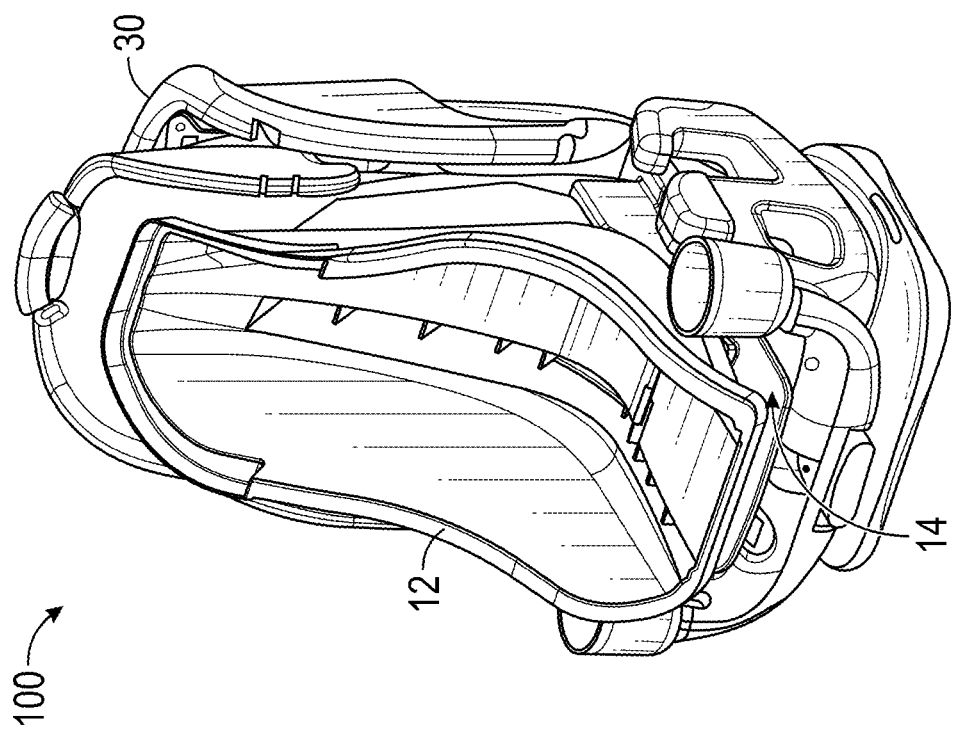
FIG. 2A is a front perspective view of a car seat assembly including the infant carrier assembly of FIG. 1A secured in a car seat.

FIG. 2A is a front perspective view of a car seat assembly 100 including the infant carrier assembly 10 of FIG. 1A secured in a car seat 30. FIG. 2B is a partial side view of the car seat assembly 30 of FIG. 2A. In particular, the adapter 14 may be located between the infant carrier 12 and the car seat 30, and the infant carrier 12 may be removably secured to the car seat 30 via the adapter 14.

In aspects, the adapter 14 may be placed within, engaged with, or secured to the car seat 30 by one or more fasteners, tabs, slots, or other attachment means. In aspects, the adapter 14 only includes the seat engagement tab 26 for securing the adapter 14 to the car seat 30. The seat engagement tab 26 may reduce or prevent movement of the adapter 14 relative to the car seat 30, for example, lateral or transverse movement, or longitudinal movement.

A user may initially install the adapter 14 in the car seat 30, and leave the adapter 14 in the car seat for a period as long as the infant carrier 12 is intended to be used. Then, the infant carrier 12 may be removably secured to the car seat 30, with the adapter 14 remaining in place during securing or removal of the infant carrier 12 to the car seat 30. It is understood that the engagement, placing, contact, or securing of the infant carrier 12 with the car seat 30 may at least partially, or entirely, be accomplished via engagement, placing, contact, or securing of the infant carrier 12 with the adapter 14.

Figure 3A:
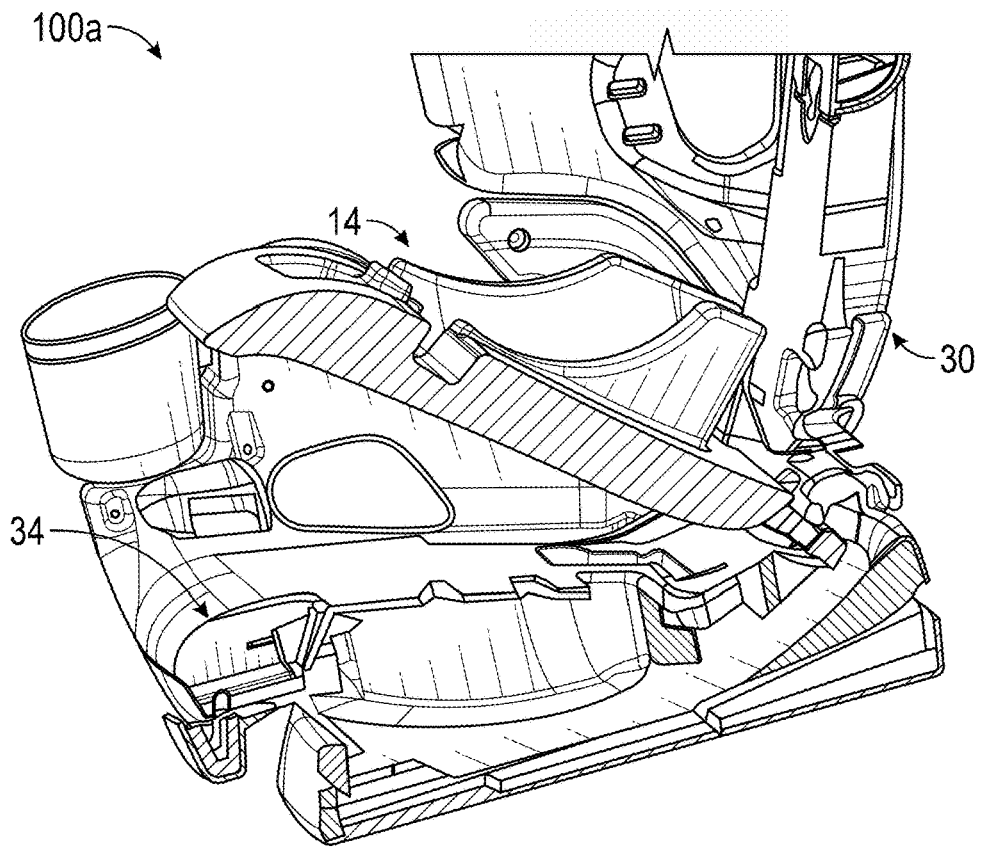
FIG. 3A is a partial cross-sectional view of the car seat assembly of FIG. 2A showing a pre-installation configuration of the adapter and the car seat.

FIG. 3A is a partial cross-sectional view of the car seat assembly 100 of FIG. 2A showing a pre-installation configuration 100a of the adapter 14 and the car seat 30. As seen in FIG. 3A, adapter 14 may initially be oriented in an inclined configuration relative to the car seat 30, to facilitate introduction of the adapter 14 within an interior or adjacent space or region of the car seat 30. One or more attachment features, such as the seat engagement tab 26, may be engaged with, received within, or secured to a portion or region of the car seat 30. The adapter 14 may include additional features to facilitate securement with the car seat 30. For example, the adapter 14 may include at least one plunger extending downward from the adapter 14 and configured to be received within a complementary opening of the car seat 30.

In aspects, the seat engagement tab 26 is U-shaped, and defines an opening 28 configured to receive a mating tab 32 of the car seat 30.

After a portion of the adapter 14 is received within, secured to, or engaged with a portion of the car seat 30, the adapter 14 may be rotated downward to contact a lower portion, for example, a seat base 34 of the car seat 30.

Figure 3B:
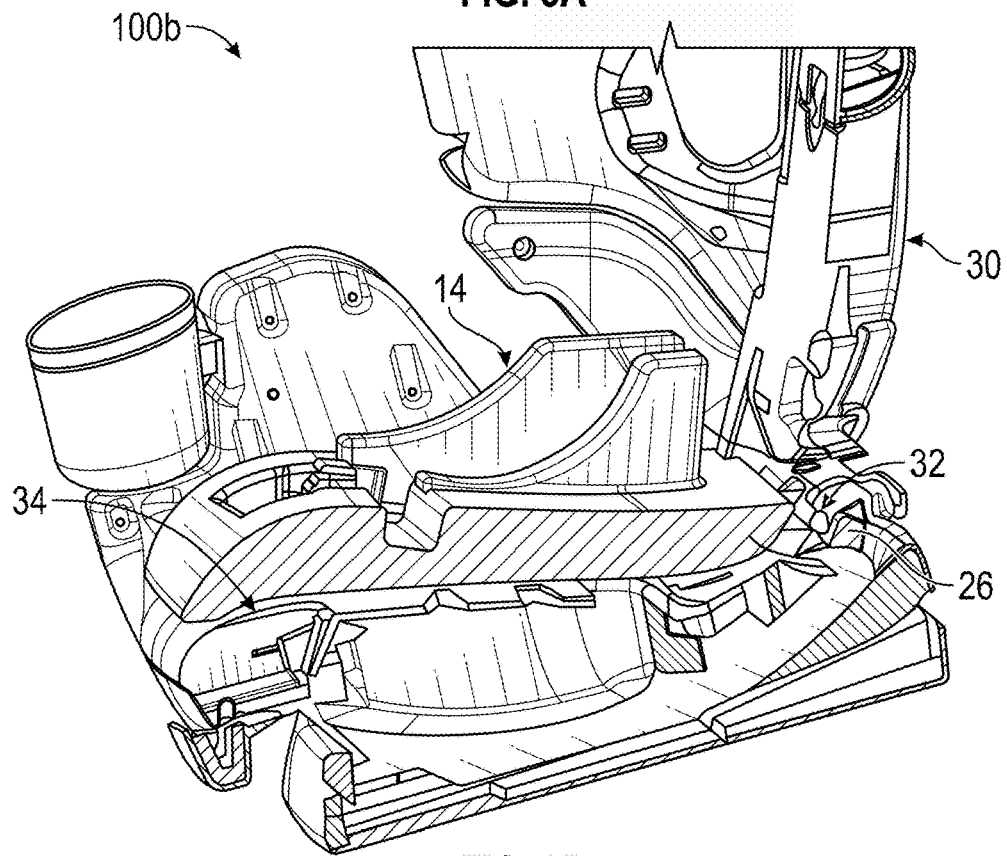
FIG. 3B is a partial cross-sectional view of the car seat assembly of FIG. 3A showing an installed configuration of the adapter and the car seat.

FIG. 3B is a partial cross-sectional view of the car seat assembly 100 of FIG. 3A showing an installed configuration 100b of the adapter 14 and the car seat 30. As seen in FIG. 3B, a lower surface of the adapter 14, rests against an upper surface of the seat base 34 of the car seat. In the configuration 100b shown in FIG. 3B, the adapter 14 (and the car seat 30) is ready to removably receive and secure the infant carrier 12.

Figure 4A:
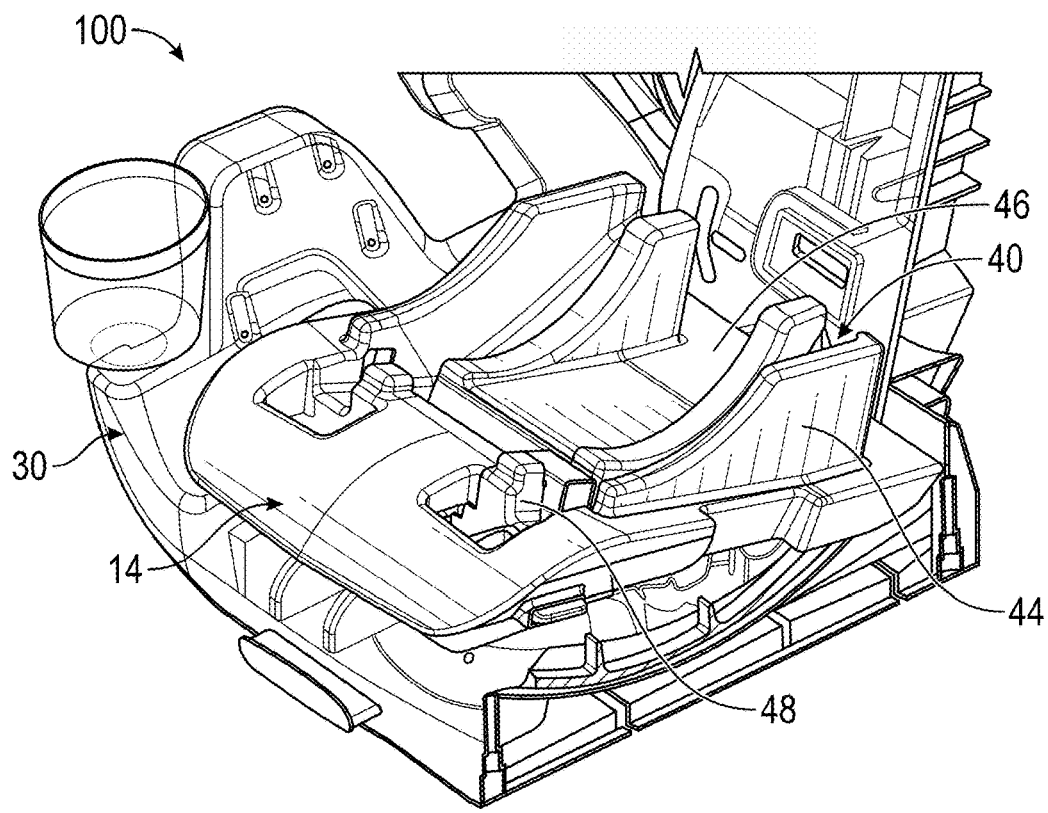
FIG. 4A is a partial perspective view of the car seat assembly of FIG. 2A showing the adapter secured to the car seat.
Figure 4B:
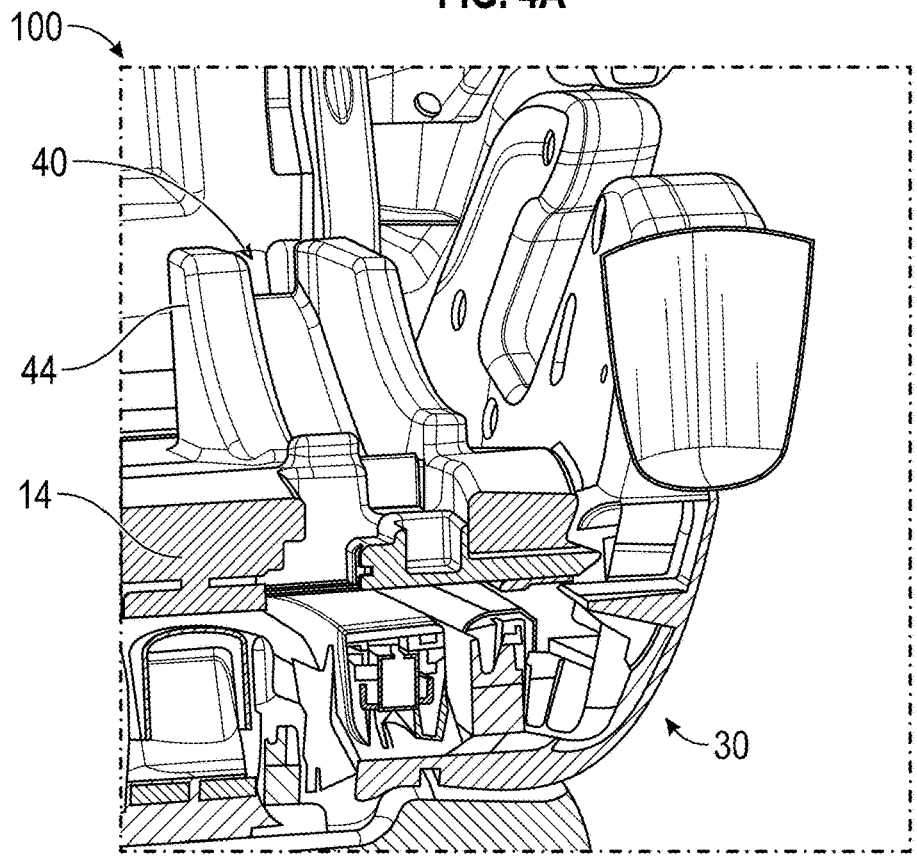
FIG. 4B is a partial front view of the car seat assembly of FIG. 4A.

FIG. 4A is a partial perspective view of the car seat assembly 100 of FIG. 2A showing the adapter 14 secured to the car seat 30. FIG. 4B is a partial front view of the car seat assembly 100 of FIG. 4A. The adapter 14 may include one or more features to facilitate the removable retention of the infant carrier 12. For example, the adapter 14 may include at least one adapter slot 40 configured to engage a rear panel 42 extending from the infant carrier 12. In aspects, the at least one adapter slot 40 extends along a direction from a rear of the adapter 14 to a front of the adapter 14.

In aspects, the at least one adapter slot 40 is defined within a respective at least one raised boss 44 extending upward from the adapter 14. The raised boss 44 may define the adapter slot 40 between raised sidewalls of the raised boss 44.

As shown in FIG. 4A, the at least one adapter slot 40 may include a first adapter slot and a second adapter slot configured to respectively engage a first panel and a second panel extending from the infant carrier 12. For example, the first adapter slot may be disposed to a right side, and the second adapter slot may be disposed to a left side, of the adapter 14.

Likewise, the at least one raised boss 44 may include a first raised boss defining the first adapter slot and a second raised boss defining the right adapter slot. The first raised boss may be disposed to a right side, and the second raised boss may be disposed to a left side, of the adapter 14. In aspects, the first raised boss is spaced from the right raised boss by an intermediate upper surface 46 of the adapter 14.

In addition to, or instead of, the adapter slot 40 and/or the raised boss 44, the adapter 14 may include other components to facilitate securing the infant carrier 12 to the adapter 14 (and ultimately, to the car seat 30). For example, the adapter 14 may include at least one attachment clip 48 for securing the infant carrier 12 to the adapter 14. The at least one attachment clip 48 may be aligned with the at least one adapter slot 40. For example, the attachment clip 48 may be positioned along an axis passing along the at least one adapter slot 40.

In aspects, the at least one attachment clip 48 includes a first attachment clip and a second attachment clip. For example, the first and second attachment clips may be disposed to a right side and a left side of the adapter 14.

Turning back to FIGS. 2A and 2B, once adapter 14 is secured to the car seat 30, at least one adapter slot 40 and/or at least one attachment clip 48 may be used to removably secure the infant carrier 12 to the adapter 14, and thus, to the car seat 30. The order of attachment may be reversed to remove the infant carrier 12 from the assembly 100. Likewise, the order of installation may be reversed to remove the adapter 14 from the car seat 30. For example, the adapter 14 may be removed for cleaning, maintenance, or replacement.

While the infant carrier 12 is shown in FIGS. 1A to 4B having a particular shape and contour, the infant carrier 12 may have any suitable geometry, shaper, or contour.

Figure 5:
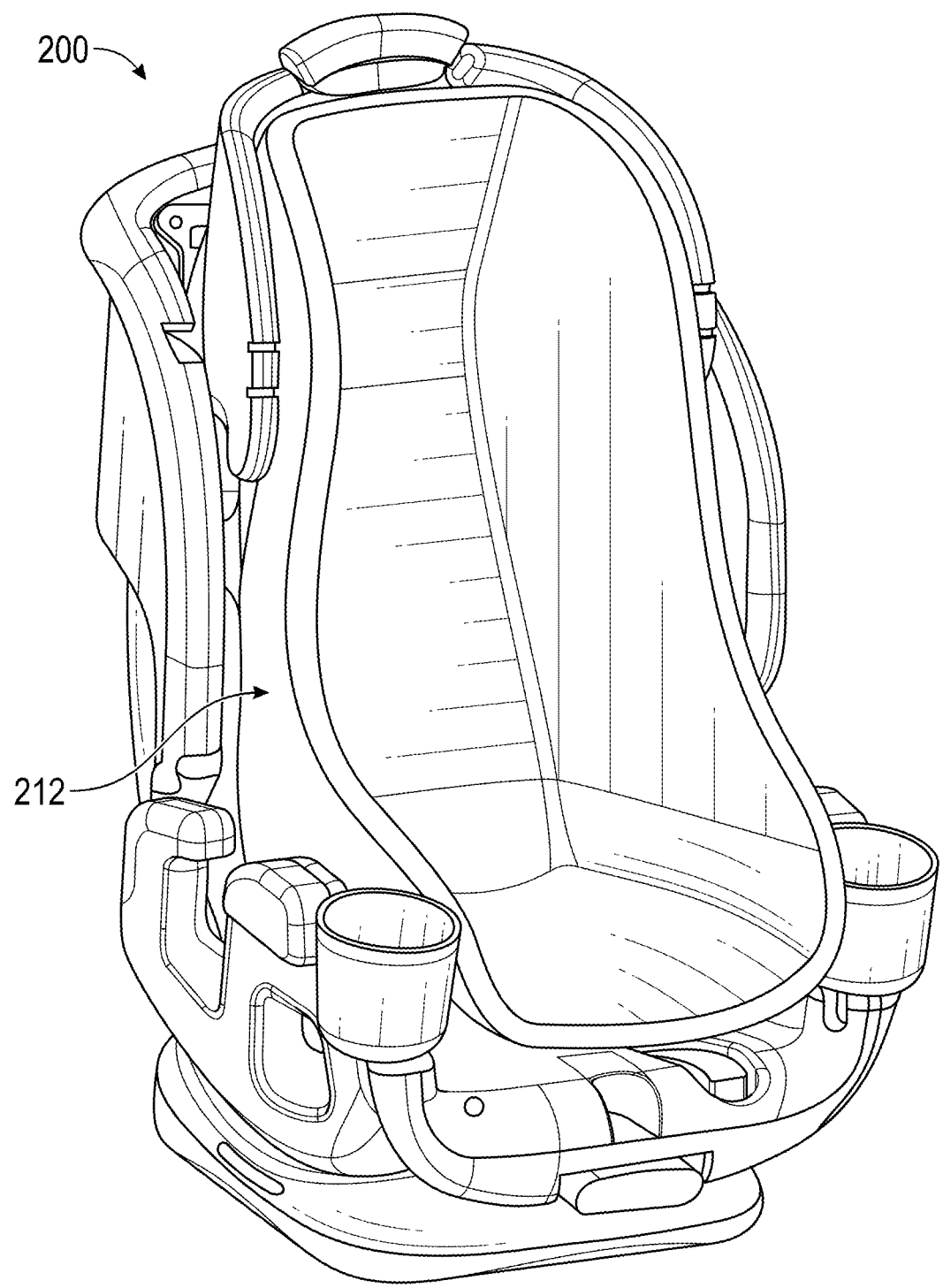
FIG. 5 is a front perspective view of a car seat assembly including an infant carrier assembly.

FIG. 5 is a front perspective view of a car seat assembly 200 including an infant carrier assembly including an infant carrier 212. The infant carrier 212 may be substantially similar to the infant carrier 12, but differing in an interior shape or contour. For example, as shown in FIG. 5, the interior region of the infant carrier 212 may have a substantially smooth surface. Like infant carrier 12, the infant carrier 212 may further include one or more of a liner, a padding, a harness, or a handle, or other features.

Thus, infant carrier assemblies according to the present disclosure may be used to removably secure an infant carrier to a car seat. In aspects, a car seat assembly according to the present disclosure includes a car seat, and an infant carrier assembly according to any aspect.

Figure 6A:
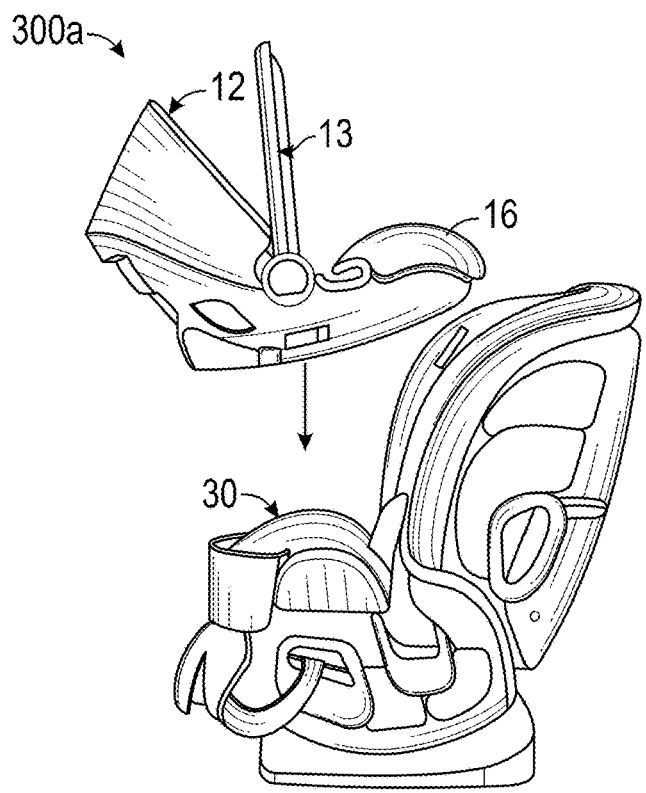
FIG. 6A is a side view of the car seat assembly of FIG. 2A in a pre-installation configuration showing the infant carrier ready to be installed in a front-facing car seat.

FIG. 6A is a side view of the car seat assembly 100 of FIG. 2A in a pre-installation configuration 300a showing the infant carrier 12 ready to be installed in a front-facing car seat 30. In aspects, the infant carrier 12 includes a carrier handle 13 rotatably coupled to the carrier shell 16 and extending across the carrier shell 16. As shown in FIG. 6A, the infant carrier 12 may be covered with a liner, having padding, and include a shade.

Figure 6B:
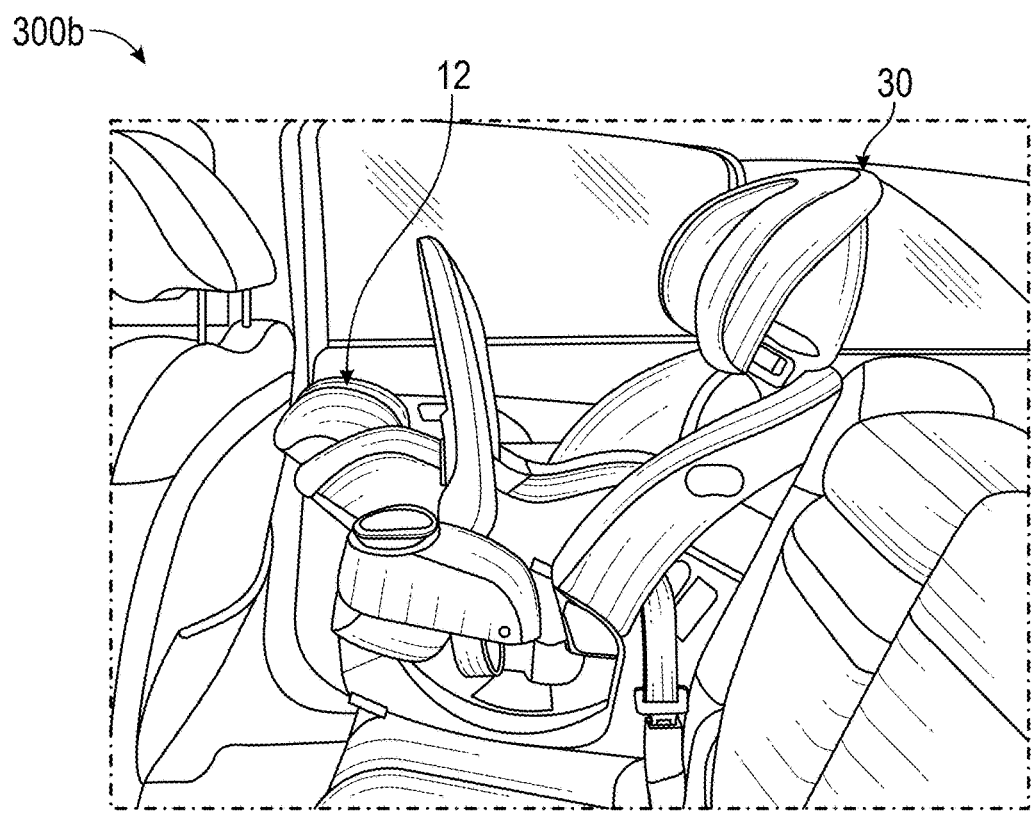
FIG. 6B is a partial view of an interior of a car showing the car seat assembly of FIG. 6A installed in a front-facing car seat configuration.

FIG. 6B is a partial view of an interior of a car showing the car seat assembly 100 of FIG. 6A installed in a front-facing car seat configuration 300b. The car seat 30 is installed in the car in a forward facing configuration. The infant carrier 12 is secured within the car seat 30 (via an adapter) in a configuration in which the infant carrier 12 faces a rear of the car seat 30. Thus, while the car seat 30 is forward facing, the infant carrier 12 is itself in a rear facing configuration, relative to a direction of travel of the car. Thus, the infant carrier 12 may face a rear of the car seat 30. While not seen in FIG. 6B, the adapter 14 is secured to the car seat 30, and the infant carrier 12 is secured to the adapter 14, the adapter 14 being disposed between the infant carrier 12 and the car seat 30.

Figure 7A:
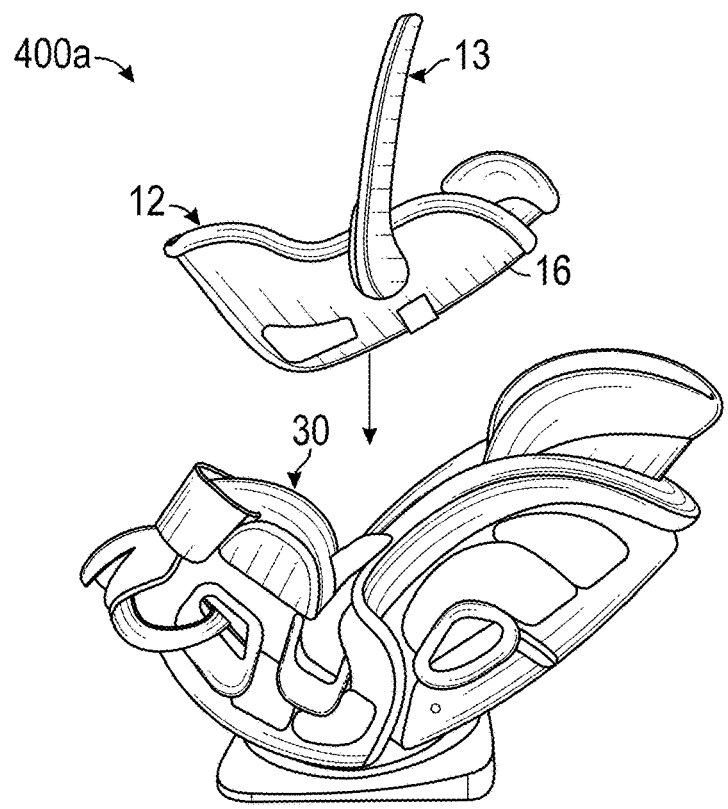
FIG. 7A is a side view of the car seat assembly of FIG. 2A in a pre-installation configuration showing the infant carrier ready to be installed in a rear-facing car seat.
Figure 7B:
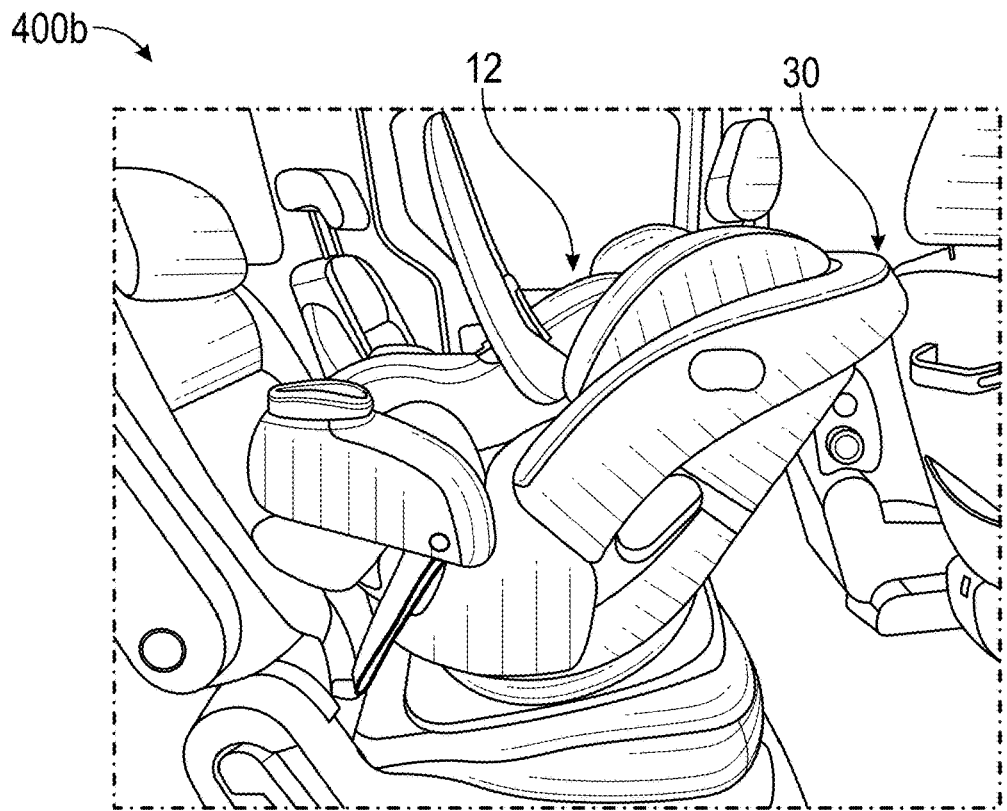
FIG. 7B is a partial view of an interior of a car showing the car seat assembly of FIG. 6A installed in a rear-facing car seat configuration.

FIG. 7A is a side view of the car seat assembly 100 of FIG. 2A in a pre-installation configuration 400*a* showing the infant carrier 12 ready to be installed in a rear-facing car seat 30. FIG. 7B is a partial view of an interior of a car showing the car seat assembly 100 of FIG. 6A installed in a rear-facing car seat configuration 400*b*. The car seat 30 is installed in the car in a rear facing configuration. The infant carrier 12 is secured within the car seat 30 (via an adapter) in a configuration in which the infant carrier 12 faces a front of the car seat 30. The car seat 30 is rear facing, and the infant carrier 12 is also in a rear facing configuration, relative to a direction of travel of the car. Thus, the infant carrier 12 may face a front of the car seat 30.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure.

While the present disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An infant carrier assembly that can be removably secured to a car seat, the infant carrier assembly comprising:
    an adapter configured to be removably secured to the car seat; and
    an infant carrier, the infant carrier being configured to be removably secured to the car seat by engagement with the adapter wherein the adapter is devoid of a backrest and the car seat comprises a backrest and is adapted to be removably supported on a vehicle seat.

2. The infant carrier assembly of claim 1, wherein a rear portion of the infant carrier is securable to the adapter, and wherein the adapter comprises:
    an adapter base configured to engage a surface of the car seat; and
    an adapter body configured to engage the infant carrier.

3. The infant carrier assembly of claim 2, wherein the adapter base defines an adapter lip configured to rest adjacent a front portion of the car seat when the adapter is secured to the car seat.

4. The infant carrier assembly of claim 3, wherein the adapter lip defines an upper lip surface and a lower lip surface, and wherein the upper lip surface and lower lip surface are curved downward.

5. The infant carrier assembly of claim 1, wherein the adapter comprises a seat engagement tab located at a rear of the adapter base.

6. The infant carrier assembly of claim 5, wherein the seat engagement tab is U-shaped and defines an opening configured to receive a mating tab of the car seat.

7. The infant carrier assembly of claim 1, wherein the adapter comprises at least one plunger extending downward from the adapter and configured to be received within a complementary opening of the car seat.

8. The infant carrier assembly of claim 1, wherein the adapter comprises at least one adapter slot configured to engage a rear panel extending from the infant carrier, wherein the at least one adapter slot extends along a direction from a rear of the adapter to a front of the adapter.

9. The infant carrier assembly of claim 8, wherein the at least one adapter slot is defined within a respective at least one raised boss extending upward from the adapter, and the at least one adapter slot comprises a first adapter slot and a second adapter slot configured to respectively engage a first panel and a second panel extending from the infant carrier.

10. The infant carrier assembly of claim 9, wherein the at least one raised boss comprises a first raised boss defining the first adapter slot and a second raised boss defining the right adapter slot.

11. The infant carrier assembly of claim 10, wherein the first raised boss is spaced from the right raised boss by an intermediate upper surface of the adapter.

12. The infant carrier assembly of claim 1, wherein the adapter comprises at least one attachment clip for securing the infant carrier to the adapter, and the at least one attachment clip is aligned with the at least one adaptor slot.

13. The infant carrier assembly of claim 1, wherein the infant carrier comprises a carrier shell covered by a liner, and the carrier shell defines a seat back extending from a seat pan.

14. The infant carrier assembly of claim 13, wherein the seat back defines a recessed portion, and the carrier shell defines a first sidewall and a second sidewall extending from the seat back and the seat pan.

15. The infant carrier assembly of claim 14, wherein the infant carrier comprises a carrier handle rotatably coupled to the carrier shell and extending across the carrier shell.

16. The infant carrier assembly of claim 1, wherein the adapter is integrally formed as a single molded unit, and the carrier shell is integrally formed as a single molded unit.

17. A car seat assembly comprising:
    a car seat comprising a backrest, the car seat configured to be removably supported on a vehicle seat; and
    an infant carrier assembly that can be removably secured to the car seat, the infant carrier assembly comprising:
        an adapter configured to be removably secured to the car seat; and
        an infant carrier, the infant carrier being configured to be removably secured to the car seat by engagement with the adapter.

18. The car seat assembly of claim 17, wherein the adapter is secured to the car seat, and wherein the infant carrier is secured to the adapter, the adapter being disposed between the infant carrier and the car seat.

19. The car seat assembly of claim 18, wherein the car seat defines a seat base, and wherein the adapter is secured to the seat base.

20. The car seat assembly of claim 17, wherein the infant carrier faces a front of the car seat.

* * * * *